United States Patent
Hana et al.

(10) Patent No.: US 7,628,598 B2
(45) Date of Patent: Dec. 8, 2009

(54) TIRE MOLD AND PNEUMATIC TIRE USING THE SAME

(75) Inventors: Kazutaka Hana, Osaka (JP); Masahiro Segawa, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 12/183,474

(22) Filed: Jul. 31, 2008

(65) Prior Publication Data
US 2009/0035404 A1    Feb. 5, 2009

(30) Foreign Application Priority Data
Aug. 2, 2007  (JP) .............................. 2007-202259

(51) Int. Cl.
*B29C 35/02* (2006.01)
*B29D 30/06* (2006.01)
(52) U.S. Cl. ................ 425/46; 152/209.24; 152/209.25
(58) Field of Classification Search .................... 425/46, 425/47; 152/209.23, 209.24, 209.25
See application file for complete search history.

(56) References Cited

U.S. PATENT DOCUMENTS

| 5,327,953 A | * | 7/1994 | Ichiki ..................... 152/209.25 |
| 7,201,570 B2 | | 4/2007 | Ohara |
| 7,329,110 B2 | * | 2/2008 | Miyamae ..................... 425/46 |

FOREIGN PATENT DOCUMENTS

| JP | 59-98834 | * | 6/1984 |
| JP | 2002-347033 | | 12/2002 |
| JP | 2003-039436 | | 2/2003 |

* cited by examiner

*Primary Examiner*—James Mackey
(74) *Attorney, Agent, or Firm*—Fish & Richardson P.C.

(57) ABSTRACT

In a tire mold 10, in which a tread molding section 12 for molding of a tread comprises a plurality of segments 18 divided in a tire circumferential direction and the respective segments are provided movably in a tire radial direction, ridges 20 for molding of transverse grooves T2 on a tread surface are protrusively provided at least at circumferential ends 23 of the segment 18 in a posture (more specifically, a posture in parallel to a direction M of movement of the segment) inclined outward to a direction toward a center Om of the segment so as to be away from a circumferentially central portion 22 of the segment as it goes toward tip ends thereof.

7 Claims, 8 Drawing Sheets

TIRE MOLD AND PNEUMATIC TIRE USING THE SAME

CROSS-REFERENCE TO RELATED APPLICATIONS

This application is based upon and claims the benefit of priority from the prior Japanese Patent Application No. 2007-202259, filed on Aug. 2, 2007; the entire contents of which are incorporated herein by reference.

BACKGROUND

The present invention relates to a tire mold, of which a tire tread molding section is divided into a plurality of segments.

In molding a pneumatic tire, there is used a metallic mold, of which a tread molding section for molding of a tire tread comprises a plurality of segments (called sector in some cases) divided in a tire circumferential direction. The tread molding section is usually divided into 7 to 13 segments and the respective segments are provided movably in a radial direction about a tire rotation axis. At the time of tire molding, a mold is closed by moving the respective segments inward in a tire radial direction in a state, in which a green tire is arranged inside the tread molding section. Then a tire is subjected to vulcanizing and molding in the mold.

With a tread molding section 100 of this kind, ridges 102 are provided on respective segments 104 to mold transverse grooves on a tread surface as shown in FIG. 9. Conventionally, all the ridges 102 are formed to project in a direction toward a center Om of the segment 104, that is, perpendicular to a mold surface 105 of the segment 104. Therefore, while a direction, in which a ridge 102C positioned centrally of the segment 104 projects, agrees with a direction M of movement of the segment 104, an angular divergence between a direction, in which the ridge 102 projects, and the direction M of movement of the segment 104 increases as it goes toward ends of the segment 104 from a center thereof. That is, in FIG. 9, an angle θ1 of divergence for the ridge 102E at the segment end is larger than an angle θ2 of divergence for the ridges 102 disposed toward the center.

When a mold having such tread molding section is used to mold a tire, in particular, in the case where vulcanizing and molding are carried out in a state, in which a green tire is supported on a rigid core without the use of any bladder, the following problem is caused because the green tire is approximately the same in outside diameter as a product tire.

That is, in this case, at the time of mold closing, respective segments of the tread molding section are moved inward in a radial direction whereby mold surfaces of the respective segments are pushed against a surface of the green tire. At this time, in particular, the ridges 102E positioned at the segment ends are large in angular divergence between directions of projection thereof and the direction M of movement of the segment 104. Therefore, as the ridges 102E enter a green tire T, rubber of the green tire T is pushed toward ends of the segment 104 from near the center thereof. Such movement of rubber causes rubber to be interposed between adjacent segments in the course of mold closing whereby bite is caused. Also, movement of rubber makes a tread non-uniform in thickness in a circumferential direction. Thereby, adverse influences are produced on uniformity such as RFV (Radial Force Variation) higher order components conformed to the number of division of segments.

In order to solve such problem, U.S. Pat. No. 7,201,570 B2 proposes a construction, in which a plurality of pieces as circumferentially divided are provided on respective segments, pieces disposed centrally of the segments are fixed, and other pieces are made circumferentially movable. In this case, the problem described above is dissolved but the mold becomes complex in structure to be responsible for an increase in manufacturing cost.

JP-A-2003-039436 discloses that a plurality of segments are divided into two groups, timing, in which the segments are closed, is composed of two stages, and segments are closed while coming into slide contact with segments having been closed previously, thereby achieving a decrease in bite. However, this method does not dissolve shift of rubber caused by ridges, which mold transverse grooves.

Also, JP-A-2002-347033 discloses that the number of segments, which is usually 8 to 9, is made, for example, 16 to 18 so as to meet with a predetermined relation, thus achieving a decrease in bite of a green tire. In this case, however, for a green tire being substantially the same in outside diameter as a product tire, it is necessary to increase the number of segments to substantially the same number as the number of pitches of a tread pattern in order to reduce shift of rubber caused by those ridges, which mold transverse grooves, to solve the problem described above, and so a vast equipment investment is required.

SUMMARY

The invention has been thought of in view of the problems and has its object to provide a tire mold capable of decreasing an amount of rubber pushed by ridges, which mold transverse grooves, at the time of molding to suppress deterioration in tire performance even in the case where a green tire having substantially the same outside diameter as an outside diameter of a product tire is used to mold a tire.

A tire mold according to an embodiment of the invention includes a tread molding section configured to mold a tread. The thread molding section includes a plurality of segments divided in a tire circumferential direction, and the plurality of segments are provided movably in a tire radial direction and include, in a tire circumferential direction, a plurality of ridges for molding of transverse grooves on a tread surface. The ridges positioned at least at circumferential ends of the segment are protrusively provided in a posture inclined outward to a direction toward a center of the segment so as to be away from a circumferentially central portion of the segment as it goes toward tip ends thereof.

Ridges positioned at circumferential ends of the segment are inclined in the manner described above whereby directions, in which the ridges project, can be made close to a direction of movement of the segment. Accordingly, an angular divergence between directions of projection and the direction of movement becomes small, so that at the time of tire molding, rubber of a green tire pushed by the ridges is decreased in amount. Therefore, rubber is inhibited from being bitten between adjacent segments in the course of the mold being closed and non-uniformity of tread thickness in a circumferential direction can be suppressed. Accordingly, with a pneumatic tire molded by the tire mold, deterioration in tire performance, such as RFV higher order components, etc., is suppressed. Also, according to the embodiment, directions, in which ridges project, are changed in the manner described above and any complex mechanism may not be assembled, so that equipment investment can be suppressed and an increase in manufacturing cost can be suppressed.

The ridges may be protrusively provided in parallel to a direction of movement of the segment whereby an amount of rubber pushed by the ridges at the time of mold closing can be further decreased.

On the other hand, when the ridges are inclined in such a manner, transverse grooves of a tread molded thereby are concavely provided in a shape inclined to a tread surface. Therefore, edges, which are acute-angled in cross section, are provided on a land portion, such as a block, formed by the transverse grooves, and decreased in stiffness to be responsible for a toe-and-heel abrasion.

As measures against such toe-and-heel abrasion, the ridges may be set so that the closer to the circumferential end of the segment the ridge is positioned, the lower a projection height thereof. The ridges are decreased in height whereby transverse grooves as formed are made shallow, so that it is possible to correspondingly ensure the stiffness, thus enabling inhibiting generation of the toe-and-heel abrasion.

As measures against the toe-and-heel abrasion, the sum of angles of inclination of both side walls of a ridge positioned at the circumferential end of the segment may be set to be smaller than the sum of angles of inclination of both side walls of a ridge positioned on a circumferentially central portion of the segment. By setting in this manner, the edge, which is acute-angled in cross section, can be made close to an obtuse angle and it is possible to correspondingly ensure the stiffness, so that it is possible to suppress generation of the toe-and-heel abrasion. Here, the angle of inclination of a side wall of a ridge is an angle formed between the side wall and a base of the ridge.

In the case where the tread molding section molds a tread being directional in a tire circumferential direction, the respective segments may be set so that the sum of angles of inclination of both side walls of a ridge toward that circumferential end, which grounds first at the time of normal rotation, is smaller than the sum of angles of inclination of both side walls of a ridge positioned on the circumferentially central portion and smaller than the sum of angles of inclination of both side walls of a ridge toward that circumferential end, which grounds later at the time of normal rotation. Since the toe-and-heel abrasion ordinarily generates on a trailing edge, stiffness ensuring means serving to make an edge which is acute-angled in cross section, close to an obtuse angle, may be adopted limitatively in a location, in which a trailing edge is acute-angled in cross section.

With the tire mold according to the embodiment, inclination of the ridges makes it possible to decrease an amount of rubber of a green tire pushed by the ridges at the time of tire molding. Therefore, rubber is inhibited from being bitten between adjacent segments and non-uniformity of tread thickness in a circumferential direction is suppressed, thus enabling suppressing deterioration in tire performance, such as RFV higher order components, etc.

DETAILED DESCRIPTION

An embodiment of the invention will be described below with reference to the drawings.

Figure 1:
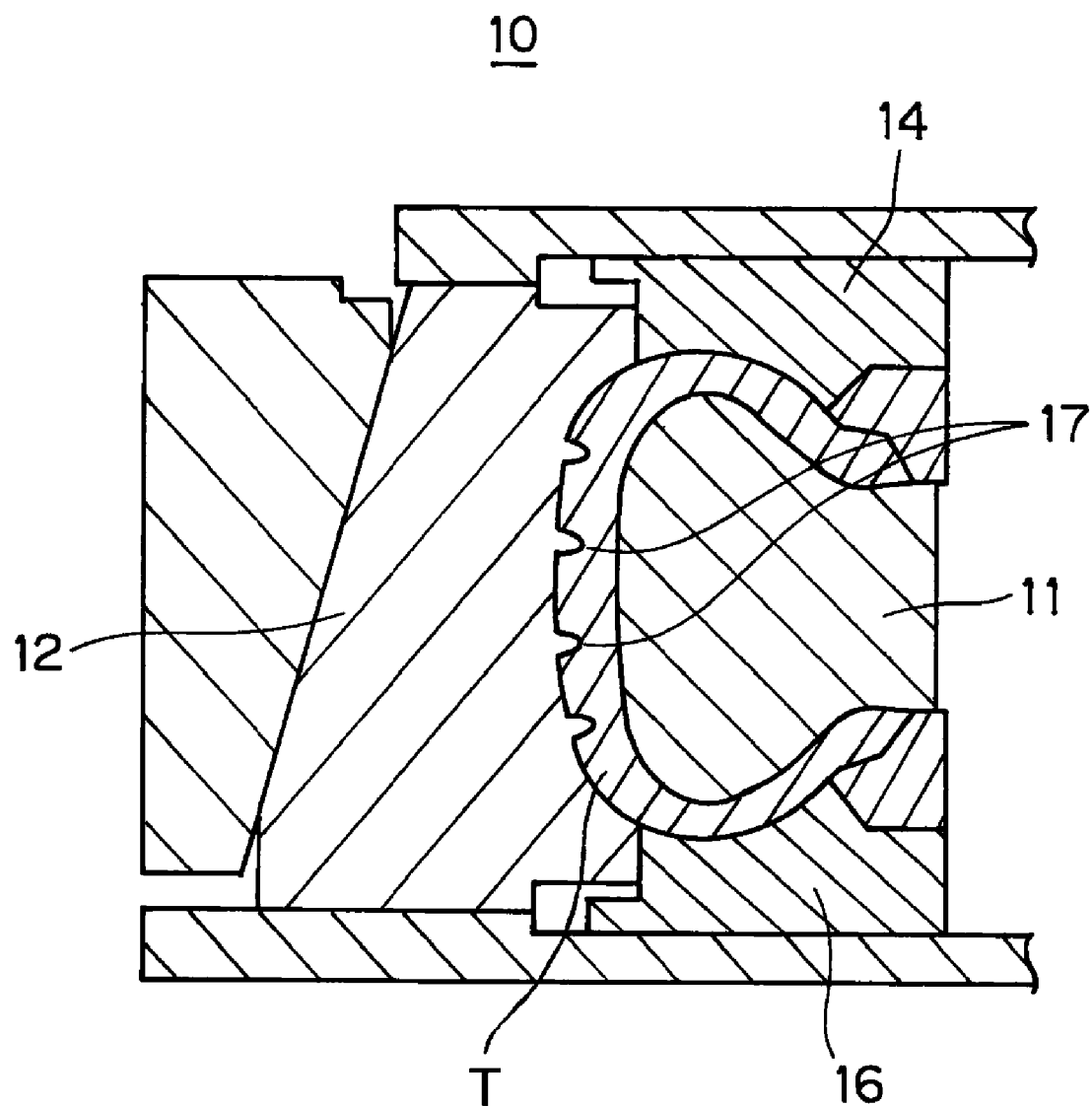
FIG. 1 is a cross sectional view showing a tire mold according to an embodiment.

FIG. 1 is a cross sectional view showing an outline structure of a tire metallic mold 10 according to the embodiment. The mold 10 includes a tread molding section 12 arranged on an outer periphery thereof so as to mold a tread of a tire, an upper side molding section 14, and a lower side molding section 16, which mold sides of a tire. A green tire T is supported on a rigid core 11 and set in the mold 10 upon closing of the respective molding sections 12, 14, 16 in this state to be subjected to vulcanizing and molding in the mold 10.

Figure 2:
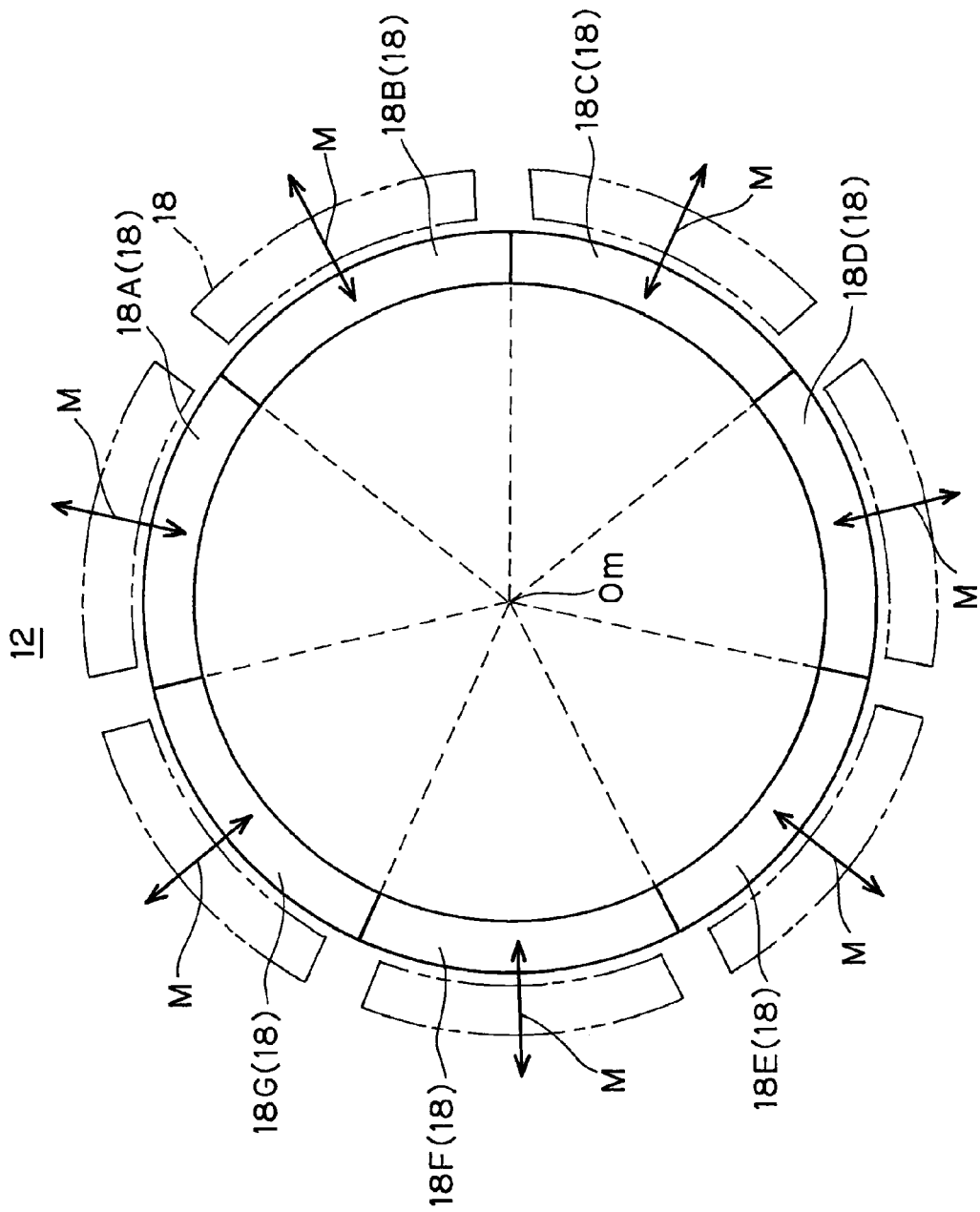
FIG. 2 is a view showing a state, in which the tread molding section is closed.

FIG. 2 is a schematic, plan view showing a state, in which the tread molding section 12 is closed. As shown in the figure, the tread molding section 12 comprises a plurality of segments 18 divided evenly in a tire circumferential direction. The segments 18 are usually 7 to 13 in division number and comprise 7 segments 18A to 18G in this example.

The respective segments 18 are provided movably in a tire radial direction (radial direction) (in the figure, directions of movement of the respective segments 18 are denoted by M). That is, the respective segments 18 are displaced in contraction and expansion at the time of mold closing indicated by solid lines and at the time of mold opening indicated by two-dot chain lines upon movement of circumferential centers thereof in the tire radial direction.

Figure 3:
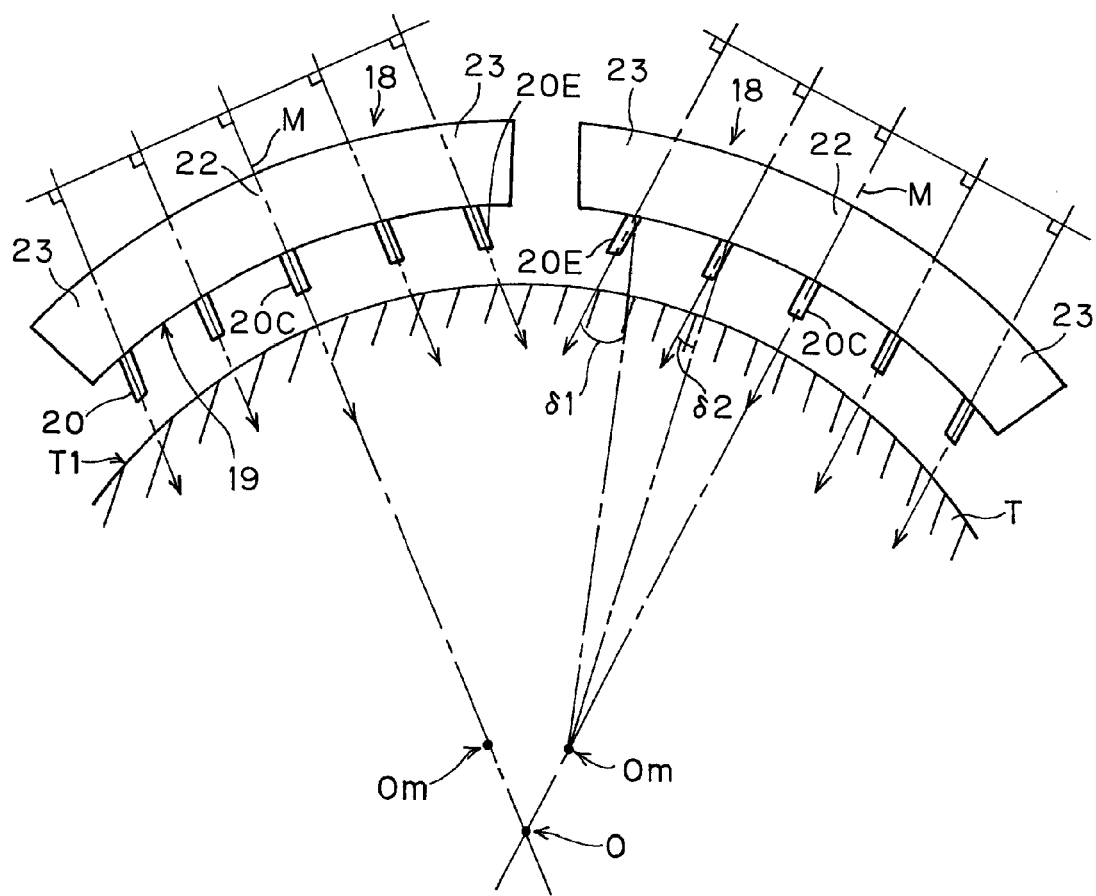
FIG. 3 is a view schematically showing the construction of segments of the tread molding section.

Provided on the respective segments 18 are ridges 17 (see FIG. 1) extending circumferentially to mold circumferential grooves, and ridges 20 extending widthwise to mold transverse grooves T2 (see FIG. 5) on a tread surface T1 of the green tire T as shown in FIG. 3. The transverse grooves T2 are ones extending in directions intersecting circumferential grooves provided on the tread surface T1 and called width grooves. The transverse grooves T2 may be not necessarily perpendicular to the circumferential grooves, that is, may extend in directions inclined to the circumferential grooves. Also, the transverse grooves T2 include cuts having a small width and generally called sipe.

Figure 9:
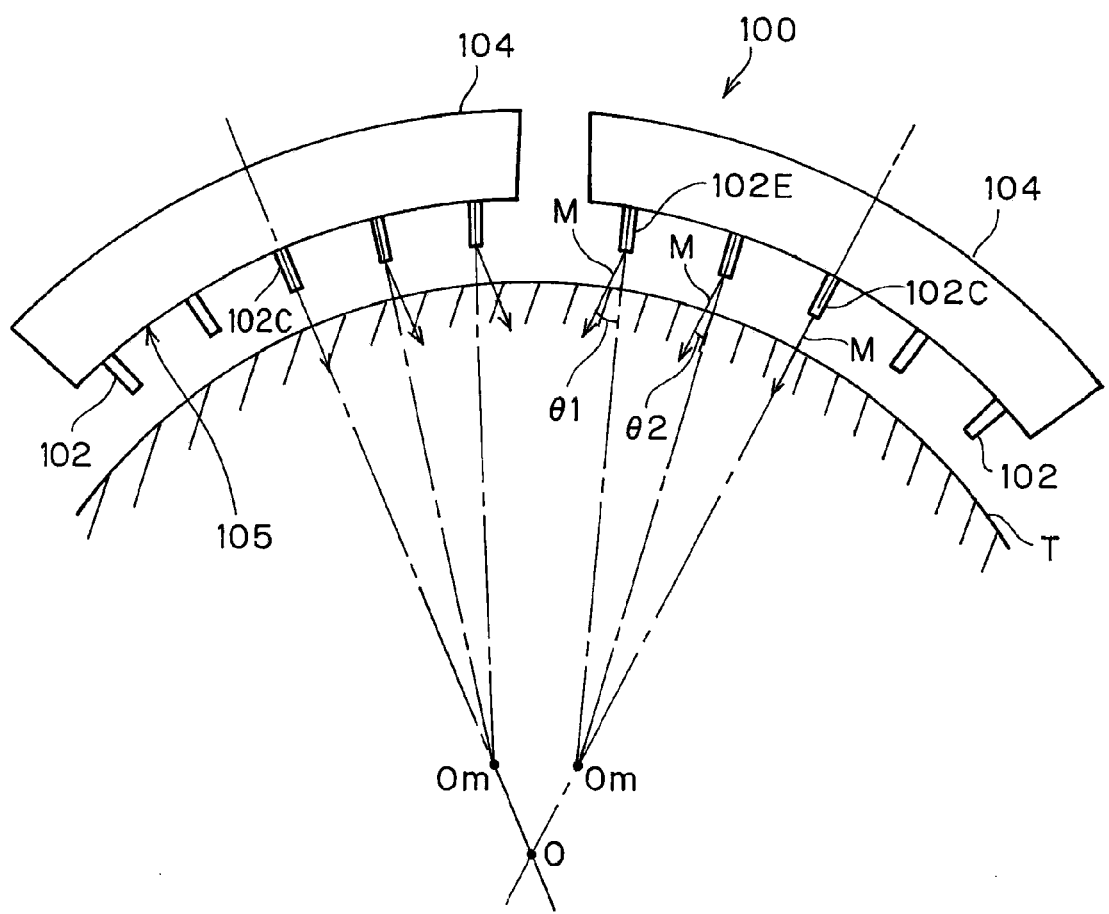
FIG. 9 is a view schematically showing the construction of a segment of a conventional tire mold.

The ridges 20 except a ridge 20C on a circumferentially central portion 22 of the segment 18 are protrusively provided in a posture inclined outward to a direction toward the center Om of the segment 18 so as to be away from the central portion 22 as it goes toward tip ends thereof. That is, while all the conventional ridges 102 are protrusively provided perpendicularly to the segment mold surface 105 to be directed toward the center Om of the segment as shown in FIG. 9, the ridges 20 in the embodiment are protrusively formed in a posture inclined toward circumferential ends relative to the direction toward the center Om as shown in FIG. 3.

The center Om of the segment 18 is a center of a circle defined by a circular arc of the segment 18 having a circular arc shape in cross section and agrees with an axis of the tread molding section 12, which is made annular when the tread molding section 12 is mold-closed (see FIG. 2). Accordingly, in a state of mold opening as shown in FIG. 3, the centers Om of the respective segments 18 are moved to positions radially shifted from a center O of the green tire T.

In this example, the ridges 20 are protrusively provided in a posture in parallel to the direction M of movement of each of the segments 18 wholly in a circumferential direction of each of the segments 18. That is, the ridges 20 are extended along the direction M of movement. Accordingly, angles of inclination of the respective ridges 20 to the direction toward the center Om of the segment 18 are set to be large for the ridges 20 toward ends 23 of the segment 18. In FIG. 3, angles δ1 of inclination of the ridges 20E at the ends 23 are larger than angles δ2 of inclination of the ridges 20 toward the center (δ1>δ2).

When the mold 10 structured in a manner described above is used to mold a pneumatic tire, the upper and lower side molding sections 14, 16 are mold-closed and the tread molding section 12 is mold-closed in a state, in which the green tire T is supported on the rigid core 11. In this manner, since vulcanizing and molding are carried out in a state of being supported on the rigid core 11 without the use of any bladder, an outside diameter of the green tire T is set to be substantially the same as an outside diameter of a product tire.

At the time of mold closing, the respective segments 18 of the tread molding section 12 are moved radially inward (directions M of movement shown in FIG. 2) whereby mold surfaces 19 of the respective segments 18 are pushed against the tread surface T1 of the green tire T. At this time, since the ridges 20 provided on the respective segments 18 are extended in parallel to the directions M of movement of the segments 18 and directions of projection thereof agree with the directions M of movement, it is possible to inhibit rubber of the green tire T from being pushed toward the ends of the segments 18 from near the centers thereof as the ridges 20 enter the green tire T.

In this manner, since rubber pushed toward the ends of the segments 18 by the ridges 20 is decreased in amount, rubber is inhibited from being bitten between adjacent segments 18, 18 in the course of the mold 10 being closed and non-uniformity of tread thickness in a circumferential direction can be suppressed. Therefore, it is possible to improve RFV higher order components.

In addition, directions, in which the respective ridges 20 project, are made in parallel to the direction M of movement of the segment 18 but they may be not necessarily put in a posture completely in parallel to the direction M of movement. As far as the ridges 20 are protrusively provided in a posture inclined outward to a direction toward the center Om of the segment 18 so as to approach the parallel posture, an effect of a decrease in amount of rubber thus pushed is produced according to an angle of inclination. Therefore, such configuration is also included in the invention. In addition, a direction, in which the ridge 20 projects, is a direction of a straight line passing through a point, at which a tip end of the ridge 20 is divided into two equal parts in a circumferential direction, and a point, at which a base of the ridge 20 is divided into two equal parts in the circumferential direction, in a cross sectional shape of the ridge 20 shown in FIG. 3.

Figure 4:
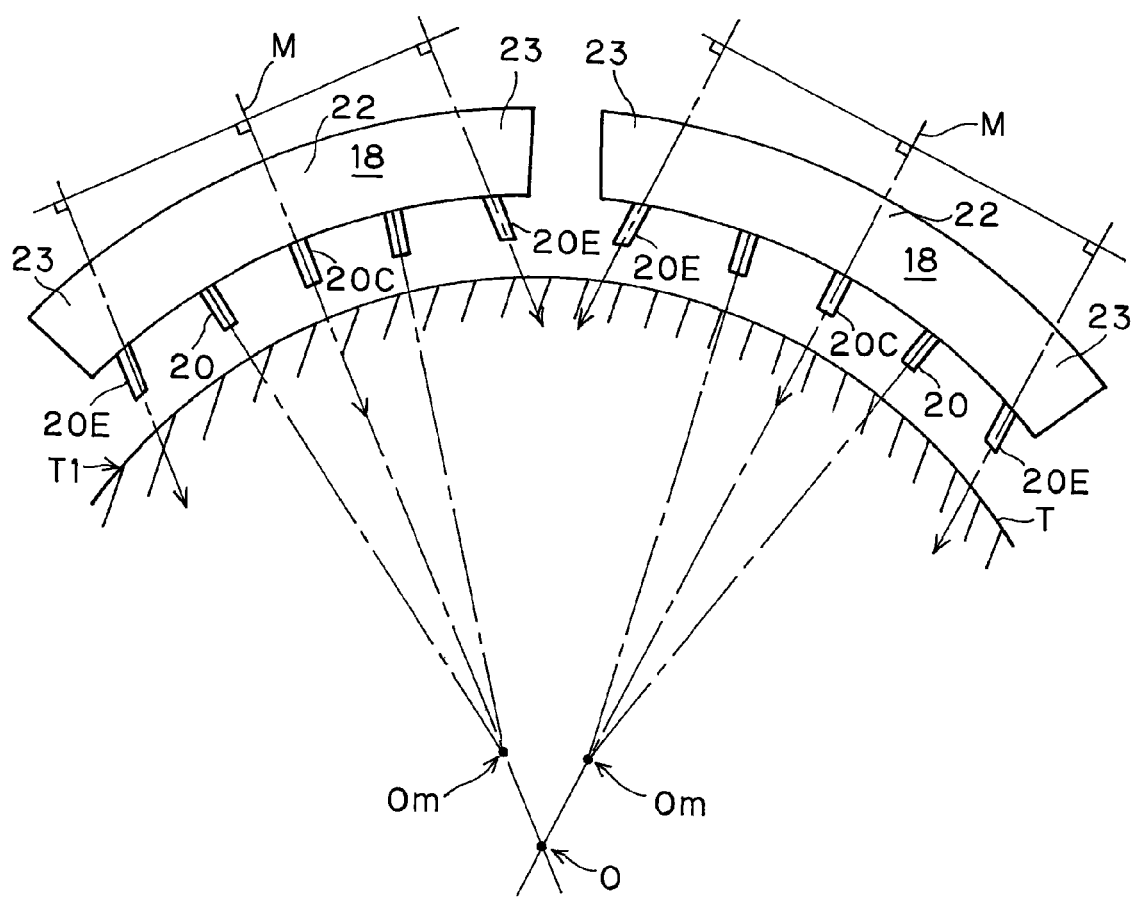
FIG. 4 is a view schematically showing the construction of segments according to a further embodiment.

FIG. 4 schematically shows a structure of segments according to a further embodiment. In this example, the structure of inclination described above is limitatively adopted for ridges 20E positioned at ends of a segment 18.

That is, in this example, the ridges 20E positioned at circumferential ends 23 of each of the segments 18 are protrusively provided in a posture in parallel to a direction M of movement of each of the segments 18. The remaining ridges 20 are protrusively provided perpendicularly to a mold surface 19 of the segment 18 to be directed toward a center Om of the segment 18 in the same manner as conventional ones. In this case, regions of the ridges 20E protrusively provided in parallel to the direction M of movement are not specifically limited as far as they are positioned at the circumferential ends 23 of the segment 18 but it is preferable to ordinarily adopt the structure of inclination, described above, every pitch of tread patterns positioned at ends of a segment and to adopt the structure of inclination, described above, at least for ridges at one pitch of tread patterns.

At the time of mold closing, rubber pushed by the ridges 20 is large in amount for ridges positioned at circumferential ends of each of segments. Therefore, even when the structure of inclination is adopted only for the ridges 20E positioned at the circumferential ends 23 as in the embodiment, an effect of a decrease in amount of rubber thus pushed is produced, thus enabling producing an effect of inhibiting rubber from being bitten and an effect of improving RFV higher order components. Other configurations, functions, and effects are the same as those for the embodiment described above and so an explanation therefor is omitted.

Figure 5A:
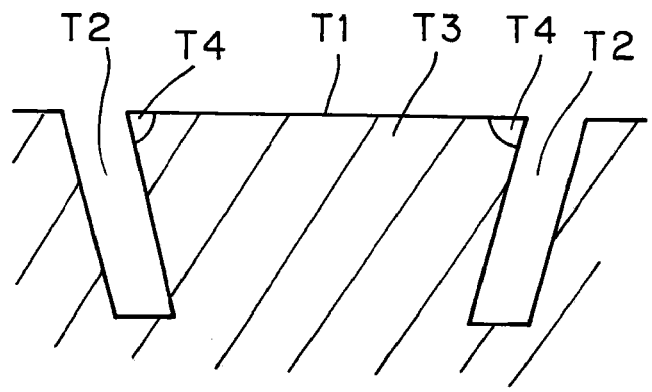
FIG. 5A is a cross sectional view showing a block of a tire molded by the segments shown in FIG. 3, FIG. 5B being a cross sectional view showing a block of a tire molded by a segment shown in FIG. 6, and FIG. 5C being a cross sectional view showing a block of a tire molded by a segment shown in FIG. 7.

When the ridges 20 are inclined in the manner described above, transverse grooves T2 of a tread molded thereby are concavely provided in a shape inclined to a tread surface T1 as shown in FIG. 5A. FIG. 5A shows a block T3 molded between adjacent segments 18, 18. As shown in the figure, the block T3 is formed with edges T4, which are acute-angled in cross section, and the edges are decreased in block stiffness to be responsible for a toe-and-heel abrasion.

Figure 6:
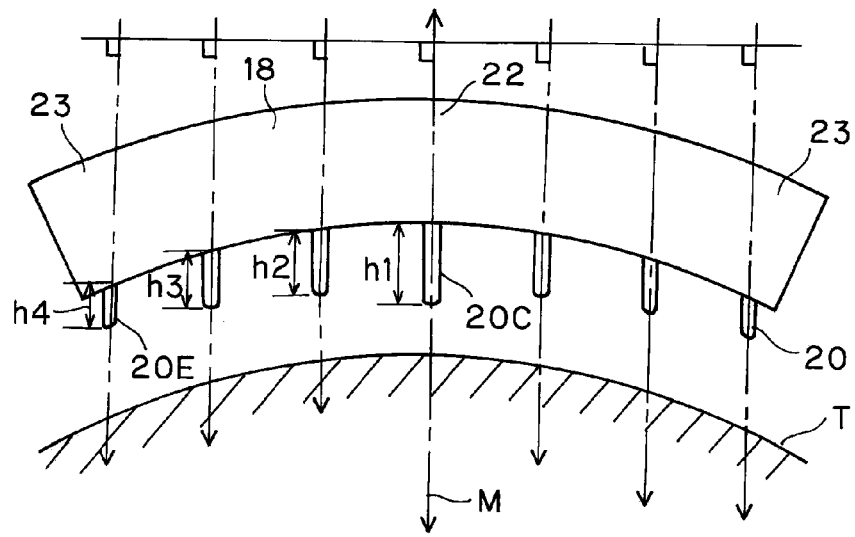
FIG. 6 is a view schematically showing the construction of a segment according to a further embodiment.

FIG. 6 shows an example of measures against the toe-and-heel abrasion and in this example. Ridges 20 on each of segments 18 are set to be decreased in projection height as they are positioned toward circumferential ends 23 of the segment 18 (h1>h2>h3>h4). That is, with a view to uniformity in block stiffness in a circumferential direction, the respective ridges 20 are formed to be decreased in projection height as angles of inclination thereof to a direction toward a center Om of the segment 18 are increased.

Figure 5B:
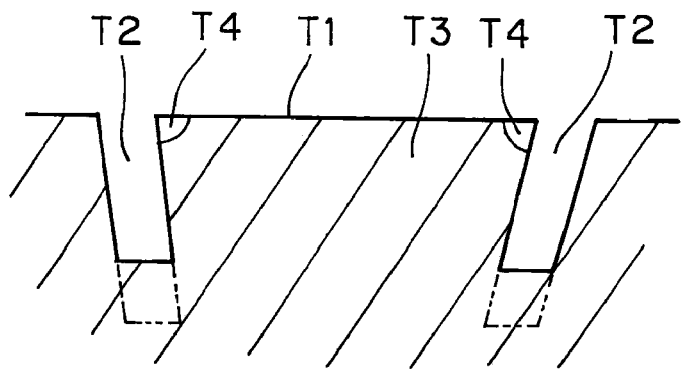

The ridges 20 are decreased in height whereby transverse grooves T2 as formed are made shallow as shown in FIG. 5B and correspondingly increased in stiffness. Therefore, it is possible to compensate for a decrease in stiffness of edges T4, which are acute-angled in cross section, thus enabling inhibiting generation of the toe-and-heel abrasion.

Figure 7:
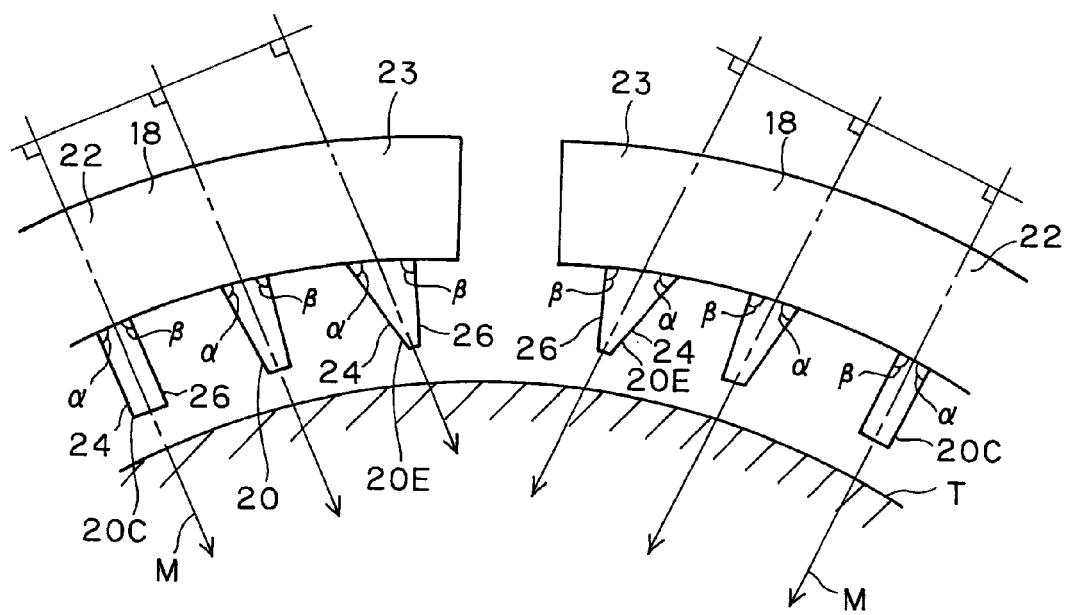
FIG. 7 is a view schematically showing the construction of a segment according to a still further embodiment.

FIG. 7 shows a further example of measures against the toe-and-heel abrasion. In this example, with a view to uniformity in block stiffness in a circumferential direction, the sum (α+β) of angles α, β of inclination of both side walls 24, 26 of a ridge 20 is set to be smaller for ridges 20 positioned at circumferential ends 23 of a segment 18 than a ridge 20 positioned on a circumferentially central portion 22 of the segment 18. Here, the angle α of inclination is an angle, which the side wall 24 toward the central portion 22 of the segment 18, out of the side walls of a ridge 20 opposed to each other in a circumferential direction, forms to a base of the ridge 20. Also, the angle β of inclination is an angle, which the side wall 26 toward an end 23 of a segment 18, out of the side walls of a ridge 20 opposed to each other in a circumferential direction, forms to the base of the ridge 20.

More specifically, in this example, the sum (a+P) of angles of inclination is set to be decreased as ridges 20 are positioned toward circumferential ends 23 of a segment 18, and therefore a taper angle (an angle formed by both side walls of a transverse groove T2) of the transverse groove T2 is set to be increased as ridges 20 are positioned toward the circumferential ends 23.

Figure 5C:
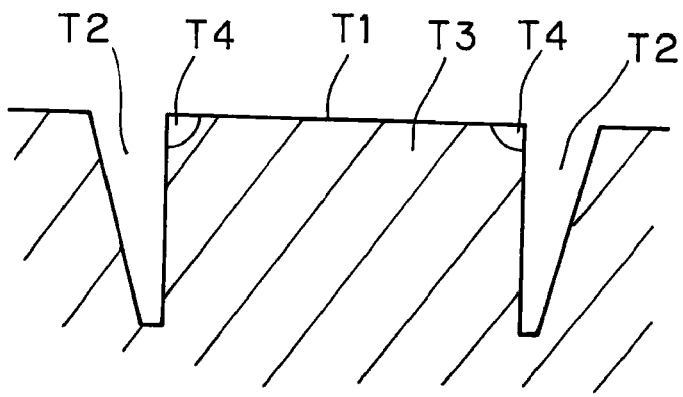

By setting in this manner, those edges T4 of a block T3, which are acute-angled in cross section, can have an angle close to a right angle or an obtuse angle as shown in FIG. 5C, so that it is possible to correspondingly ensure the stiffness, thus enabling inhibiting generation of the toe-and-heel abrasion.

Figure 8:
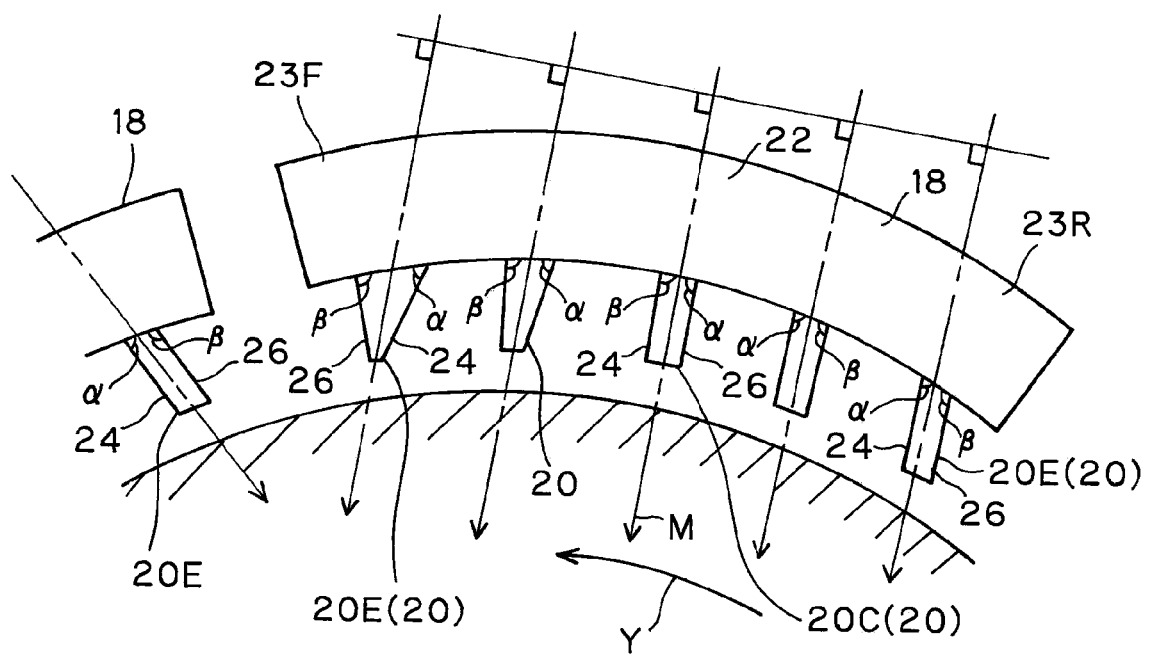
FIG. 8 is a view schematically showing the construction of a segment according to a still further embodiment.

FIG. 8 shows a still further example of measures against the toe-and-heel abrasion. This example is pertinent to the case where a tread molding section 12 is used to mold a tread being directional in a tire circumferential direction.

Since the toe-and-heel abrasion ordinarily generates at a trailing edge of a block, which grounds later, this example adopts stiffness ensuring means limitatively in a location, in which a trailing edge is acute-angled in cross section, the means serving to make the edge, which is acute-angled in cross section, close to an obtuse angle.

That is, as shown in FIG. 8, for each of the segments 18, the sum ($\alpha+\beta$) of angles of inclination of both side walls of a ridge 20 toward a circumferential end 23F, which grounds first at the time of normal rotation of a tire (Y indicates a normal rotation of a tire), is set to be smaller than the sum ($\alpha+\beta$) of angles of inclination of both side walls of a ridge 20 positioned on a circumferentially central portion 22 and smaller than the sum ($\alpha+\beta$) of angles of inclination of both side walls of a ridge 20 toward a circumferential end 23R, which grounds later at the time of normal rotation of a tire. In this example, the sum ($\alpha+\beta$) of angles of inclination of a ridge 20 positioned on the circumferentially central portion 22 and the sum ($\alpha+\beta$) of angles of inclination of a ridge 20 toward the circumferential end 23R, which grounds later at the time of normal rotation of a tire, are set to be equal to each other.

By setting in this manner, the block trailing edge, which grounds later at the time of normal rotation of a tire, can have an angle close to a right angle or an obtuse angle rather than an acute angle in cross section, so that it is possible to effectively inhibit the toe-and-heel abrasion, while preserving other characteristics.

EXAMPLES

The metallic mold adopting the structures of the respective embodiments shown in FIGS. 3, 4, 6 and 7 and illustrated above were used for vulcanizing and molding of a pneumatic tire and so effects thereof were confirmed (Examples 1-4). Tires were molded by setting a tire size to 215/60R16, setting an outside diameter of a green tire to be equal to an outside diameter of a product tire, and not using any bladder, that is, making a belt lift rate 0%.

As comparative examples with the use of a metallic mold, which adopts the conventional structure shown in FIG. 9, a tire was molded by using a bladder and making a belt lift rate 3% (Comparative example 1) and a tire was molded by not using a bladder and making a belt lift rate 0% (Comparative example 2).

The tread molding sections of all the examples and the comparative examples comprise 7 segments.

For tires obtained by the respective examples and the comparative examples, RFV seventh order components were evaluated and the toe-and-heel abrasion was evaluated.

Methods of evaluation are as follows.

RFV seventh order components: JIS D4230 Tire Uniformity Measuring Method was used to measure RFV, and seventh order components were calculated by order analysis and represented by an exponent with a value of Comparative example 1 being 100. It is meant that the smaller an exponent, the more favorable.

Toe-and-heel abrasion: Abrasion tests by practical vehicle (2500 cc FF vehicle made in Japan) were carried out on the abrasion test course of this firm and steps between blocks after traveling covering 10000 km were measured and represented by an exponent with a value of Comparative example 1 being 100. It is meant that the smaller an exponent, the more favorable.

TABLE 1 indicates the results that in the case where a tire were subjected to vulcanizing and molding by setting an outside diameter of a green tire to be equal to an outside diameter of a product tire, RFV seventh order components were improved by using molds of Examples 1-4, as compared with the case where the conventional mold of Comparative example 2 was used. Also, by using the molds of Examples 3 and 4, the toe-and-heel abrasion found on the molds of Examples 1 and 2 was dissolved and an effect of improving RFV higher order components and an effect of improving the toe-and-heel abrasion could be made compatible with each other.

TABLE 1

|  | COMPARATIVE EXAMPLE 1 | COMPARATIVE EXAMPLE 2 | EXAMPLE 1 | EXAMPLE 2 | EXAMPLE 3 | EXAMPLE 4 |
| --- | --- | --- | --- | --- | --- | --- |
| METALLIC MOLD | FIG. 9 | FIG. 9 | FIG. 3 | FIG. 4 | FIG. 6 | FIG. 7 |
| BELT LIFT RATE | 3% | 0% | 0% | 0% | 0% | 0% |
| RFV SEVENTH ORDER COMPONENT | 100 | 197 | 100 | 135 | 100 | 100 |
| TOE-AND-HEEL ABRASION | 100 | 100 | 130 | 112 | 100 | 100 |

What is claimed is:

1. A tire mold comprising
   a tread mold section including a plurality of segments divided in a tire circumferential direction to mold a tread, the plurality of segments being provided movably in a tire radial direction, and
   a plurality of transverse ridges provided on each of the segments, the plurality of ridges being spaced from each other in a tire circumferential direction to mold transverse grooves on a tread surface,
   wherein the ridges positioned at least at circumferential ends of each of the segments are protrusively provided in a posture inclined outward toward tip ends of each segment and away from a radial direction of each segment so as to be directed away from a circumferentially central portion of each segment, and
   wherein the ridges positioned at least at the circumferential end of each of the segments are set so that the sum of angles of inclination of both side walls of each such ridge is smaller than the sum of angles of inclination of both side walls of a ridge positioned on a circumferentially central portion of the segment.

2. The tire mold according to claim 1, wherein the ridges positioned at least at the circumferential ends are protrusively provided in parallel to a direction, in which each of the segments is movable.

3. The tire mold according to claim 1, wherein the ridges are set so that the closer to the circumferential ends of the segments the ridge is positioned, the lower a projection height thereof.

4. The tire mold according to claim 1, wherein the tread molding section molds a tread being directional in a tire circumferential direction and the respective segments are set so that the sum of angles of inclination of both side walls of a ridge toward a first circumferential end for molding a leading tire tread portion is smaller than the sum of angles of inclination of both side walls of a ridge positioned on the circumferentially central portion and smaller than the sum of angles of inclination of both side walls of a ridge toward a second circumferential end for molding a trailing tire tread portion.

5. The tire mold according to claim 2, wherein the ridges are set so that the closer to the circumferential ends of the segments the ridges are positioned, the lower a projection height thereof.

6. The tire mold according to claim 2, wherein the tread molding section molds a tread being directional in a tire circumferential direction and the respective segments are set so that the sum of angles of inclination of both side walls of a ridge toward a first circumferential end for molding a leading tire tread portion is smaller than the sum of angles of inclination of both side walls of a ridge positioned on the circumferentially central portion and smaller than the sum of angles of inclination of both side walls of a ridge toward a second circumferential end for molding a trailing tire tread portion.

7. A pneumatic tire molded by the tire mold according to claim 1.

* * * * *